Nov. 1, 1966 R. H. CAMPBELL 3,283,073

INTERCOMMUNICATION SYSTEM AND EAVESDROPPING
PREVENTING MEANS THEREFOR

Filed Nov. 30, 1962

INVENTOR.
RICHARD H. CAMPBELL

BY

Mason, Kolehmainen, Rathburn and Wyss.
Attorneys

United States Patent Office 3,283,073
Patented Nov. 1, 1966

3,283,073
INTERCOMMUNICATION SYSTEM AND EAVESDROPPING PREVENTING MEANS THEREFOR

Richard H. Campbell, Rockford, Ill., assignor to Webster Electric Company, Racine, Wis., a corporation of Delaware Filed Nov. 30, 1962, Ser. No. 241,332
16 Claims. (Cl. 179—1)

Figure 1:
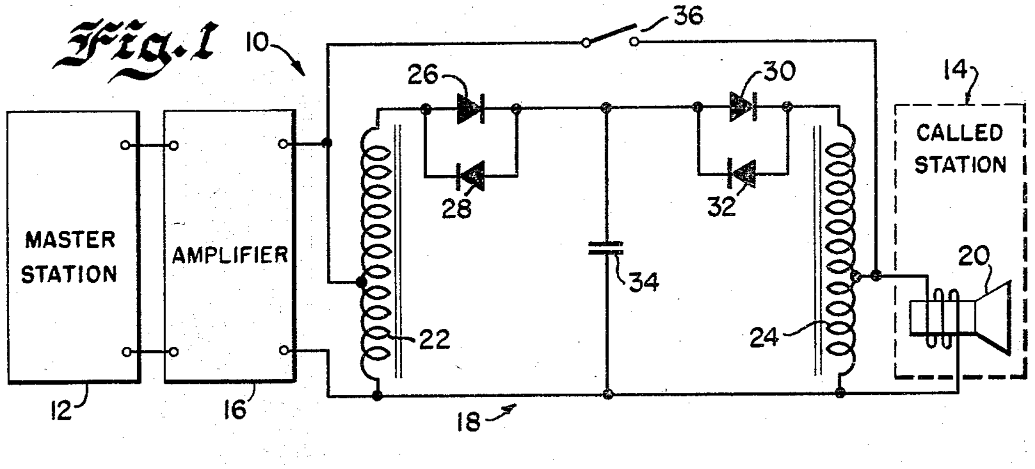

This invention relates to a communication system and, more particularly, to a new and improved intercommunication system including means for assuring the privacy of a called station against eavesdropping.

An intercommunication system commonly includes a plurality of spaced stations that can be selectively placed in communication with each other through amplifying means. One or more of the stations can comprise master stations including means for selecting other called stations to which a communication channel including the amplifying means is to be extended. Since the speakers used in the called stations commonly also provide the station microphone, the existence of a communication channel from a master station to a called station permits the operator at the calling station to listen to the called station without the knowledge of the called station. This eavesdropping is not desirable in many intercommunication installations.

A number of different expedients have been adopted in an attempt to insure the privacy of the system users. In one approach to this problem, stations are provided with visual indicators that are operated when a communication path is extended to a called station so that the called party is warned that the station microphone is operative. In other systems attempts have been made to render the communication channel or amplifier effective to transmit only from the calling station to the called station until some operation is performed at the called station to permit bidirectional transmission. This type of system has the disadvantage that it is necessary for the called party to move to the called station and perform a manual switching operation in order to carry on a normal conversation with the calling party.

Accordingly, one object of the present invention is to provide a new and improved intercommunication system.

Another object is to provide an intercommunication system including new and improved privacy means for preventing eavesdropping.

Another object is to provide an intercommunication system including means for providing substantially distortion-free communication from a calling station to a called station while preventing transmission from the called station to the calling station to insure the privacy of the called station personnel.

A still further object is to provide a communication system including means for insuring distortion-free transmission of low signal levels over a signaling link including at least a pair of series connected diodes.

A further object is to provide an intercommunication system including a communication channel having diode means for normally permitting signal transmission between calling and called stations in only a single direction and additional means for insuring the absence of transmission in the reverse direction.

Another object is to provide an intercommunication system including a unidirectional signal transmitting channel and timed means for permitting transmission in a reverse direction.

Another object is to provide an intercommunication system including means responsive to signal transmission from a calling station for selectively enabling signal transmission over the channel from a called station.

In accordance with these and many other objects, an intercommunication system embodying the present invention includes one or more master stations and a plurality of other stations which are adapted to be selectively interconnected for communication through an amplifying means. Each of the called stations in the system includes a bilateral electroacoustical transducer or microphone-loudspeaker that is coupled to the amplifier over a communication channel. The communication channel consists of two pairs of oppositely poled, parallel connected diodes connected in series between the bilateral transducer and the amplifier.

When a call is extended from a master station through the amplifier to the called station, the relatively high level alternating current output from the amplifier is coupled through the two pairs of diodes to the bilateral transducer to normally provide transmission from the calling station to the called station. However, any alternating current signals generated by the transducer at the called station cannot be returned over the communication channel through the amplifier to permit eavesdropping.

The diodes provided in the channel are easily driven into their conductive state by the output of the amplifier to provide normal communication from the master or calling station to the called station. Since this transmission takes place through the linear, highly conductive portion of the characteristic of the diodes, this transmission is efficient and substantially free of distortion. However, the amplitude of the signals generated by the transducer in the called station are of such a low level that the diodes in the channel remain in a substantially nonconductive state to prevent transmission over the channel in a reverse direction. Even though these diodes provide an extremely high impedance to low level inputs, a relatively low level signal can be coupled through the inherent or distributed capacitance of the nonconductive diodes to the amplifier which might result in eavesdropping. To prevent any signal coupling in the reverse direction over the channel, a relatively large value capacitive means is connected in shunt across the channel at the point of common connection of the two pairs of diodes. This capacitive means provides a low impedance path to any alternating current coupled through the diodes and substantially prevents the transmission of any signals over the channel to the transducer at the calling station through the amplifier.

When the transmission from the called station to the calling station is desired, a switching means at the called station can be manually actuated to directly connect the called station to the amplifier means. Alternatively, a switching means can be connected to the communication channel to provide a forward bias at the point of common connection of the two pairs of diodes to forward bias a pair of back-to-back diodes, one in each of the parallel connected pairs thereof, to a point on the nonlinear characteristic of the diodes. When the very low level signals from the called station transducer are applied to the signaling link or communication channel, the two forward biased diodes provide a transmission path from the bilateral transducer in the calling station to the amplifier.

In addition, because the two forward biased diodes are connected back-to-back or in series opposition, the applied alternating current input signals from the calling station transducer produce substantially equal and opposite changes in the impedance of the forward biased diodes so that any distortion arising from operating these diodes on the low signal level, nonlinear portions of their characteristics is obviated. Thus, substantially distortion-free transmission to the called station is provided.

In many applications, it is desirable to avoid the necessity of manually actuating a switch at the called station to permit reverse transmission over the communication channel while yet retaining the privacy feature. This end is accomplished in the intercommunication system embodying the present invention by providing a circuit responsive to alternating current signals received from the master station for biasing the diode means in the communication channel into a conductive condition for a given period of time to permit transmission over the channel from the called station in the reverse direction. In one embodiment, a portion of the alternating current voice signals supplied at the output of the amplifying means is rectified and applied as an enabling or forward bias to the two pairs of diodes at the point of common connection thereof. One diode in each of the pairs is forward biased to permit transmission in the reverse direction over the channel from the called staton transducer to the amplifier. Since this enabling is dependent on the receipt of voice signals of suitable amplitude from the amplifying means, personnel at the called station are audibly advised of the extension of a communication path to the called station and the privacy function of the system is retained. The bias provided by the rectification of the alternating current signals supplied to the channel by the amplifying means can be used to charge a capacitor in an RC timing circuit so that the channel is conditioned for response from the called station for only a predetermined time. This period can be extended by the periodic transmission of signals from the calling station to the called station.

Figure 2:
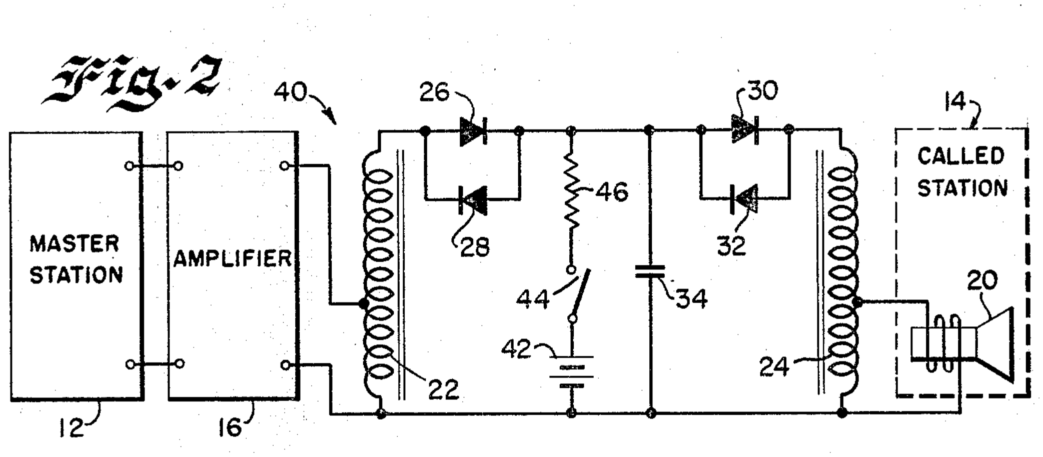
Figure 3:
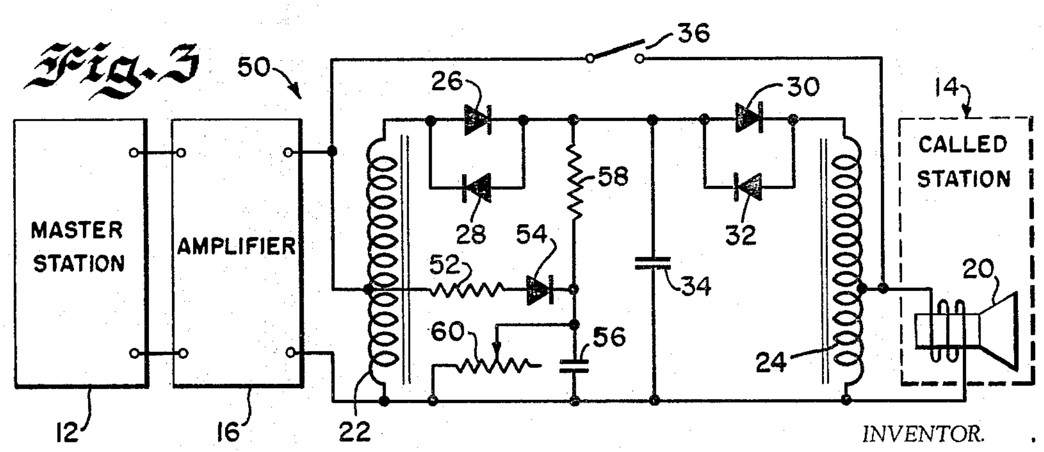

Many other objects and embodiments of the present invention will become apparent when considering the following detailed description in conjunction with the drawings, in which:

FIG. 1 is a schematic circuit diagram of an intercommunication system embodying the present invention;

FIG. 2 is a schematic diagram of an intercommunication system similar to FIG. 1 which includes means for conditioning a communication channel in the system for substantially distortion-free bidirectional transmission; and FIG. 3 is a circuit diagram of an intercommunication system similar to those shown in FIGS. 1 and 2 which includes means for providing continuous transmission in one direction over a communication channel and timed transmission in a reverse direction.

Referring now more specifically to FIG. 1 of the drawings, therein is shown a intercommunication system embodying the present invention which is indicated generally as 10 and which includes at least one master station 12 and a plurality of called stations 14. The master station 12 and the called stations 14 are arranged for voice communication through an amplifying means 16 and a plurality of communication channels indicated generally as 18, each of which is individual to one of the called stations 14. Each of the communication channels 18 normally provides transmission only from the amplifier 16 to a bilateral electroacoustical transducer or loudspeaker-microphone 20 in connected called station 14 and prevents the transmission of the low level alternating current signals generated by the speaker-microphone 20 in a reverse direction to the amplifying means 16.

Each communication channel 18 includes a pair of autotransformers 22 and 24 connected to the amplifier 16 and the called station 14, respectively, and connected in series with two pairs of oppositely poled and parallel connected diodes 26, 28 and 30, 32. The diodes 26, 28 and 30, and 32 are preferably formed of silicon with a forward threshold or minimum conducting voltage on the order of .1 volt. With an applied signal on the order of 1 volt or greater, these diodes are placed in a highly conductive state that is not substantially altered by the application of signals of an increased amplitude. In the range below 1 volt, the conduction or impedance characteristic of the diodes is substantially nonlinear.

When a call is to be extended from the master station 12 to a selected one of the called stations 14, the necessary switching operations to perform the selection are made at the master station 12, and the amplifier 16 is connected between the master station 12 and the input terminals of the communication channel 18 for the desired called station 14. These selecting operations can be performed by any of the circuits and mechanical switching assemblies long used in intercommunication systems. When the selecting operations have been completed, the application of voice modulation to the microphone at the master station 12 results in the application of high level alternating current output signals to the autotransfer 22 from the output of the amplifying means 16. These high level signals have an amplitude in excess of 1 volt and place the diodes 26, 30 and 28, 32 in highly conductive conditions during positive and negative half cycles, respectively, of the input signal so that the high level output signals provided by the amplifier 16 are applied substantially without attenuation and distortion to the bilateral transducer 20 in the selected called station 14. The autotransformer 22 increases the level of the output from the amplifier 16 to avoid any clipping or distortion of the base line portions of the alternating current signal in the range below .1 volt. The autotransformer 24 is substantially identical to the transformer 22 so that the communication channel 18 does not provide an impedance missmatch between the amplifier 16 and the called station 14. Thus, the communication channel 18 provides efficient and distortion-free transmission of the high level signals from the amplifier 16 to the called station 14.

However, the establishment of the selected switching path from the master station 12 to the called station 14 does not permit eavesdropping at the called station. The speaker-microphone 20, when subjected to audio frequency modulation, provides an alternating current output on the order of .002 volt which is applied to the input of the autotransformer 24. The autotransformers 22 and 24 provide a step-up voltage ratio of approximately 10 to 1. Thus, the alternating signals applied to the diodes 26, 28, 30, and 32 resulting from the low level signals supplied to the autotransformer 24 are on the order of .02 volt which is far below the .1 volt threshold value of these diodes. Thus, voice modulated signals cannot be transmitted from the called station 14 to the master station, and the privacy of the user of the called station 14 is assured.

Even though the nonconductive or high impedance condition of the diodes 26, 28, 30, and 32 should substantially prevent transmission over the channel 18 in a reverse direction, these diodes include a discrete amount of distributed capacitance through which the output signal from the called station 14 can be capacitively coupled to the amplifier 16. A small amount of resistance leakage is also inherent in most diodes, and the combined capacitive and resistive leakage can provide a signal at the amplifier 16 that would be of sufficient amplitude to permit eavesdropping. In order to prevent this leakage transmission or coupling through the two pairs of diodes, a capacitor 34 is connected across the channel 18 at the point of common connection of the two pairs of diodes. The value of the capacitor 34 is made rather large compared to the value of the distributed capacitance of the diodes 26, 28, 30, and 32 so that it effectively provides a very low impedance shunt across the channel 18 for alternating current voltages. In effect, the capacitor 34 provides a voltage dividing network with the impedance of the diodes 30 and 32. Since the impedance to alternating current voltages provided by the capacitor 34 is low, the potential applied across the autotransformer 22 due to the signals generated by the speaker-microphone in the called station 14 is not sufficient to provide an output signal at the master station 12 following amplification by the amplifier 16 that rises to the hearing level. The shunting capacitor 34 does not adversely affect the transmission of signals from the master station 12 to the called station 14 because the impedance of the capacitor 34 to voice frequency signals is high relative to the extremely low impedance of the forward biased diodes 26, 28, 30, and 32.

The intercommunication system 10 can also include means that permit personnel at the called station 14 to transmit signals back to the master station 12 afer having been advised that a communication path has been extended to the called station. A manually actuated switch 36 at the called station 14 is directly connected between the bilateral transducer 20 in the called station 14 and the amplifier 16. When two-way communication between the master station 12 and called station 14 is to be provided, the called party at the station 14 manually closes the switch 36 to connect the bilateral transducer 20 directly to the amplifier 16. This completely bypasses the diodes 26, 28, 30, and 32 and provides efficient and distortion-free transmission in both direction between the master station 12 and the called station 14. The system 10 is returned to a normal condition in which communication is permitted from only the master station 12 to the called station 14 by opening the switch 36.

FIG. 2 of the drawings illustrates on inter-communication system 40 that is substantially identical to the system 10 except that alternate means are provided for permitting transmission over the communication channel 18 in a reverse direction. More specifically, the switch 36 directly connected between the amplifier 16 and the called station 14 can be removed and replaced by a biasing network including a direct current potential source or battery 42, a manually actuated switch 44, and a current limiting resistor 46 which are connected in series between the common line of the communication channel 18 and the point of common connection of the two pairs of diodes 26, 28 and 30, 32. When the switch 44 is closed, the biasing network permits transmission in a reverse direction from the called station 14 to the master station 12 without introducing the distortion normally encountered when low level signals are transmitted through diodes.

More specifically, the closure of the switch 44 biases the diodes 26 and 32 in their reverse direction and applies a forward bias to the back-to-back diodes 28 and 30. The level of the bias provided by the battery 42 is such that these two diodes are in the nonlinear portion of their characteristic. When the low level signals generated by the speaker-microphone 20 in the called station 14 are applied to the communication channel 18, these alternating current signals are forwarded to the amplifier 16 through the forward biased diodes 28 and 30 which are shunted by the high impedance provided by the reverse biased diodes 26 and 32. With signals of the low level provided by the bilateral transducer 20, a series transmission path through a pair of diodes normally causes a considerable distortion of the signal. However, with the bias supplied by the battery 42 to the like terminals of the diodes 28 and 30, the alternating current signal tends to produce equal and opposite impedance changes in these diodes to provide substantially distortion-free transmission. As an example, when a positive cycle of the input signal is applied to the communication channel 18, the impedance of the forward biased diode 30 is increased an amount generally equal to the decrease in the impedance of the forward biased diode 28. This effect is reversed on negative cycles of the input alternating current signals so that this signal is transmitted through the diodes 28 and 30 without the distortion normally caused by operating diodes in the nonlinear portion of their characteristic. The channel 18 is returned to its normal condition in which it is capable of transmitting only from the master station 12 to the called station 14 by opening the switch 44 to remove the forward bias from the diodes 28 and 30.

FIGURE 3 of the drawings illustrates an intercommunication system 50 which is substantially the same as the systems 10 and 40 and which includes means for automatically rendering the communication channel 18 capable of transmitting signals from the called station 14 to the master station 12 for a predetermined period of time in response to the transmission of signals from the master station 12 to the called station 14. As in the circuits 10 and 40, the two pairs of diodes 26, 28 and 30, 32 normally permit transmission only from the master station 12 to the called station 14. However, when the alternating current input signal is applied to the autotransformer 22 from the amplifier 16, a portion of this signal is forwarded through a resistor 52 and a diode 54 to change a capacitor 56. The direct current potential across the capacitor 56 is forwarded through an isolating resistor 58 to forward bias the diodes 28 and 30 in the manner described with reference to the system 40 illustrated in FIG. 2 of the drawings. Thus, the receipt of alternating current signals originating at the master station 12 automatically applies a direct current forward bias to the back-to-back connected diodes 28 and 30 to provide a conductive path for transmitting the low level signals provided by the speaker-microphone 20 at the called station 14. A variable resistance 60 is connected across the capacitor 56 to provide a discharge path for this capacitor. When the potential across the capacitor 56 is dissipated, the forward bias is removed from the diodes 28 and 30, and the communication channel 18 returns to its unidirectional transmitting condition. By varying the magnitude of the resistance 60, the time constant of the circuit including the resistance 60 and the capacitor 56 is varied to change the duration of the interval in which the channel 18 is automatically conditioned for bidirectional transmission.

Although the present invention has been described with reference to a number of embodiments thereof, it should be understood that numerous other modifications and embodiments can be devised by those skilled in the art that will fall within the spirit and scope of the principles of this invention.

What is claimed and desired to be secured by Letters Patent of the United States is:

1. In a signaling system, bidirectional amplifying means providing a high level alternating current output signal, station means including a bilateral electroacoustical transducer providing a low level alternating current output signal, and a signaling channel connected between the amplifying means and the station means for transmitting high level signals from the amplifying means to the transducer and for preventing the transmission of low level signals from the transducer to the amplifying means, said channel including two pairs of oppositely poled and parallel connected diodes, the pairs being connected in series at a point of connection.

2. The signaling system set forth in claim 1 including means for selectively applying a direct current bias of a given polarity to the point of common connection of said two pairs of diodes to selectively render said signaling channel effective both to transmit low level signals from the transducer to the amplifying means and to transmit high level signals from the amplifying means to the transducer.

3. The signaling system set forth in claim 1 including means controlled by the high level signal applied to the channel for rendering said channel effective both to transmit low level signals from the transducer to the amplifying means and to transmit high level signals from the amplifying means to the transducer.

4. In a signaling system, bidirectional amplifying means providing a high level alternating current output signal, station means including a bilateral electroacoustical transducer providing a low level alternating current output signal, a signaling channel connected between the amplifying means and the station means for transmitting high level signals from the amplifying means to the transducer and for preventing the transmission of low level signals from the transducer to the amplifying means, said channel including two pairs of oppositely poled and parallel connected diodes, the pairs being connected in series at a point of connection, and impedance means connected to the point of connection of the two pairs of diodes and providing a low impedance signal path when said diodes are in their conductive state and a relative high impedance path when the diodes are in their nonconductive state.

5. In a signaling system, first means for receiving signals and for providing high level output alternating current signals; a second means for receiving signals and for providing low level alternating current signals; and a signaling channel interconnecting said first and second means to permit transmission of the high level signals from the first means to the second means and to prevent the transmission of the low level signals from the second means to the first means, said signaling channel including two pairs of parallel connected and oppositely poled diodes, the pairs being connected in series at a point of connection between the first and second means, said diodes being operable to a conductive state by the high level alternating current signals and remaining in a substantially nonconductive state when the low level alternating current signals are applied, and impedance means connected to the point of connection of the two pairs of diodes and providing a low impedance signal path when said diodes are in their conductive state and a relative high impedance path when the diodes are in their nonconductive state.

6. In a signaling system, first means for receiving signals and for providing high level output alternating current signals; second means for receiving signals and for providing low level alternating current signals; and a signaling channel interconnecting said first and second means to permit transmission of the high level signals from the first means to the second means and to prevent the transmission of the low level signals from the second means to the first means, said signaling channel including two pairs of parallel connected, oppositely poled diodes, the pairs being connected in series at a point of connection between the first and second means, said diodes being operable to a conductive state by the high level alternating current signals and remaining in a nonconductive state when low level alternating current signals are applied, and means for applying a direct current potential to the point of common connection of the two pairs of diodes to bias one diode in each of said pairs to a conductive state to permit the transmission of the low level signals from the second means to the first means over the signaling channel.

7. The signaling system set forth in claim 6 additionally comprising a transformer connected to said first means, said transformer having a first output connected to said signaling channel and having a second output for supplying signals in response to high level output alternating current signals provided by said first means, and wherein said direct current potential applying means comprises a rectifying circuit connected between said second output and the point of connection of the two pairs of diodes.

8. The signaling system set forth in claim 7 additionally comprising a resistive and capacitive circuit connected to said rectifying circuit for maintaining the direct current potential for a predetermined time period after a high level output alternating current signal from said first means.

9. In a signalling system, the combination of a signal source providing an alternating current output signal, a signal receiver operated by said output signals, a signalling channel for transmitting signals from the signal source to the signal receiver and including a pair of diodes along the path of signals transmitted by the channel, the diodes being connected in series with like poles connected together, said diodes having a nonlinear impedance characteristic over a given range of applied voltages and said output signal having an amplitude of substantially the same order as the given range of applied voltages, and means for applying a direct current voltage to the two diodes to bias each diode to substantially the same extent in its forward direction to a point in the nonlinear impedance characteristic so that the alternating current output signal transmitted over the channel produces generally equal and opposite changes in the impedance of the diodes, said voltage applying means including means for connecting the direct current voltage to the connected like poles of the diodes.

10. In a signalling system, the combination claimed in claim 9 wherein the nonlinear impedance characteristic of said diodes includes a high initial forward resistance, and wherein said output signal is insufficient to overcome the high initial forward resistance of said diodes.

11. A signaling system comprising first and second stations, a single communication channel connecting the first and second stations adapted to be used alternately for transmission of signals in two directions over substantially the same current path between the stations, first means in said channel for permitting communication over said channel only from said first station to said second station, signal responsive means for disabling said first means to permit communication both from said second station to said first station and from said first station to said second station, and means for applying signals received from said first station to said signal responsive means.

12. A signaling system comprising first and second stations supplying output signals, a signaling channel connecting said first and second stations and including diode means for normally permitting transmission of only the output signals from said first station to said second station, and means responsive to the output signals applied to said channel by said first station for controlling a bias applied to said diode means for selectively rendering said channel effective both to transmit output signals from said second station to said first station and to transmit output signals from said first station to said second station.

13. A signaling system comprising first and second stations supplying output signals, a signaling channel connecting said first and second channels and including diode means for normally permitting transmission of only the output signals from said first station to said second station, rectifying means for supplying a potential to said diode means to permit the transmission of signals both from said second station to said first station and from said first station to said second station, and means for applying a portion of the output signals from said first station to said rectifying means.

14. A signaling system comprising first and second stations each supplying output signals, a signaling channel connecting the first and second stations, said channel normally being operative to transmit output signals only from said first station to said second station, and timing means responsive to signals received from said first station for controlling said channel to permit transmission of output signals from said second station to said first station over said channel for a predetermined time period.

15. The signaling system set forth in claim 14 in which said timing means includes a circuit including resistive and capacitive elements, the circuit being supplied with the output signals from said first station.

16. In a signaling system, first signal receiving and sending means, second signal receiving and sending means, a signaling channel connecting the first and second signal receiving and sending means and including two pairs of oppositely poled diodes, the diodes of each pair being connected in parallel with each other, the two parallel connected pairs of diodes being connected in series with each other, and means connected to said signaling channel for controlling said channel to transmit signals from the first means to the second means over paths including both of the diodes in both of the pairs thereof and to transmit signals from the second means to the first means over a path excluding a single diode in each of the pairs thereof.

References Cited by the Examiner

UNITED STATES PATENTS

| | | | |
|---|---|---|---|
| 2,322,833 | 6/1943 | Dickieson | 179—170.6 |
| 2,577,792 | 12/1951 | Meers et al. | 179—170.8 |
| 2,841,647 | 7/1958 | Blow | 179—1.4 |
| 3,050,582 | 8/1962 | Faherty | 179—170.2 |
| 3,145,266 | 8/1964 | Owen | 307—88.5 |
| 3,175,045 | 3/1965 | Bayer et al. | 179—1.4 |
| 3,215,789 | 11/1965 | Hunter et al. | 179—170.6 |

KATHLEEN H. CLAFFY, *Primary Examiner.*

ROBERT H. ROSE, *Examiner.*

J. W. JOHNSON, *Assistant Examiner.*